United States Patent
Banavar et al.

(10) Patent No.: US 10,117,051 B2
(45) Date of Patent: Oct. 30, 2018

(54) LOCALIZATION USING WIRELESS SIGNALS

(71) Applicants: Mahesh Banavar, Potsdam, NY (US); Kevin Mack, Binghamton, NY (US)

(72) Inventors: Mahesh Banavar, Potsdam, NY (US); Kevin Mack, Binghamton, NY (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 15/419,390

(22) Filed: Jan. 30, 2017

(65) Prior Publication Data

US 2017/0223498 A1    Aug. 3, 2017

Related U.S. Application Data

(60) Provisional application No. 62/288,798, filed on Jan. 29, 2016.

(51) Int. Cl.
| | |
|---|---|
| *H04W 4/02* | (2018.01) |
| *H04W 4/80* | (2018.01) |
| *H04W 64/00* | (2009.01) |
| *H04W 84/12* | (2009.01) |
| *H04W 4/021* | (2018.01) |

(52) U.S. Cl.
CPC ............ *H04W 4/021* (2013.01); *H04W 4/80* (2018.02); *H04W 64/00* (2013.01); *H04W 84/12* (2013.01)

(58) Field of Classification Search
CPC ..... H04W 4/021; H04W 24/08; H04W 4/008; H04W 84/12
See application file for complete search history.

(56) References Cited

U.S. PATENT DOCUMENTS

| | | | | |
|---|---|---|---|---|
| 9,426,622 | B2* | 8/2016 | Bao | H04W 4/023 |
| 9,432,808 | B1* | 8/2016 | Reyes | G06Q 50/205 |
| 2008/0204321 | A1* | 8/2008 | Yanagihara | G01S 5/0284 |
| | | | | 342/450 |
| 2008/0309556 | A1* | 12/2008 | Hohl | G01S 5/0289 |
| | | | | 342/451 |

* cited by examiner

*Primary Examiner* — Joseph Dean, Jr.
(74) *Attorney, Agent, or Firm* — Bond Schoeneck & King, PLLC; George R. McGuire; Blaine T. Bettinger

(57) ABSTRACT

A method for localization of a target device within an environment, the method comprising the steps of: (i) receiving, by a target device, a plurality of wireless signals transmitted from one or more anchor devices within the environment; (ii) determining, by a target device, a received signal strength indication for at least some of the received plurality of wireless signals; (iii) estimating, based on the determined received signal strength indications, a distance from the target device to each of the one or more anchor devices from which a wireless signal was received; and (iv) estimating, based on the estimated distances, a location of the target device within the environment.

5 Claims, 7 Drawing Sheets

LOCALIZATION USING WIRELESS SIGNALS

CROSS-REFERENCE TO RELATED APPLICATION

This application claims priority to U.S. Provisional Patent Application Ser. No. 62/288,798, filed on Jan. 29, 2016 and entitled "Bluetooth Localization on Android," the entire disclosure of which is incorporated herein by reference.

GOVERNMENT FUNDING

This invention was supported by the National Science Foundation, Grant No. NSF-1464222. The United States Government has certain rights in the invention.

FIELD OF THE INVENTION

The present disclosure is directed generally to methods and systems for localization under conditions where conventional localization techniques are not available, and more particularly to methods and systems for localization using wireless networks.

BACKGROUND

Over the past few decades, localization devices and methods have traditionally relied upon global positioning systems (GPS). These ubiquitous global navigation satellite systems provide an adequate estimate of location in most areas around the world. However, GPS localization is not infallible, and as a result there are many locations where the signals are not sufficiently detected to allow for localization.

For example, transmissions from GPS satellites are often blocked by buildings in city settings, by landscape and trees in outdoor settings, and by the earth in subway systems or other transportation systems. Perhaps the most common interference with GPS localization occurs inside buildings where satellite reception is inadequate. In each of these conditions, there is a demand for adequate localization techniques.

Accordingly, there is a continued need in the art for localization methods and systems that work in settings where localization techniques such as GPS are not available.

SUMMARY

The present disclosure is directed to methods and systems for localization using wireless networks (WSNs) in conditions where conventional localization techniques such as GPS are not available. The localization methods operate using comparative distance measurement, which precludes the need for strict clock synchronization among devices and enables heterogeneous cross-platform WSNs. According to an embodiment, the system utilizes Bluetooth® signals for localization. The received signal strength indication (RSSI) value of Bluetooth signals from several devices are recorded, and the distance to each device can be estimated using the RSSI value (ranging). This ranging information is then used for localization. The output of the localization analysis provides the relative positions of the target devices.

According to an embodiment, the device need only transmit a Bluetooth signal in order to implement localization, rather than pair Bluetooth devices. This is accomplished by allowing the transmitter to be discoverable by other Bluetooth devices. The first step in the localization process is self-calibration, which makes the system adaptable to different environments and allows the algorithm to work independent of transmit power. Once the system has self-calibrated, localization can be attempted on a target through multilateration.

According to an aspect is a method for localization of a target device within an environment. The method includes the steps of: (i) receiving, by a target device, a plurality of wireless signals transmitted from one or more anchor devices within the environment; (ii) determining a received signal strength indication for at least some of the received plurality of wireless signals; (iii) estimating, based on the determined received signal strength indications, a distance from the target device to each of the one or more anchor devices from which a wireless signal was received; and (iv) estimating, based on the estimated distances, a location of the target device within the environment.

According to an embodiment, the method further includes the step of performing a calibration of the one or more anchor devices.

According to an embodiment, the step of performing a calibration includes the step of receiving, by each anchor device, a plurality of RSSI samples from another anchor device within the environment.

According to an embodiment, the anchor devices are fixed within the environment.

According to an embodiment, the step of estimating a location of the target device within the environment comprises trilateration or multilateration.

According to an embodiment, the wireless signal is a WiFi, ZigBee, Bluetooth signal, or other wireless protocols.

According to an embodiment, the method is repeated as the target device moves within the environment.

According to an embodiment, the target device comprises an application configured to perform said determining and estimating steps.

According to an aspect is a system for localization of a target device within an environment. The system includes: a plurality of anchor devices located within the environment, each of the plurality of anchor devices configured to transmit a plurality of wireless signals; and a target device located within the environment, the target device configured to: (i) receive at least some of the plurality of transmitted wireless signals; (ii) determine a received signal strength indication for at least some of the received plurality of wireless signals; (iii) estimate, based on the determined received signal strength indications, a distance from the target device to each of the one or more anchor devices from which a wireless signal was received; and (iv) estimate, based on the estimated distances, a location of the target device within the environment.

According to an embodiment, the target device comprises an application configured to perform said determining and estimating steps.

According to an aspect is a target device configured to estimate its location within an environment. The target device includes a wireless signal receiver configured to receive a plurality of wireless signals transmitted by a plurality of anchor devices located within the environment; and a processor configured to (i) determine a received signal strength indication for at least some of the received plurality of wireless signals; (ii) estimate, based on the determined received signal strength indications, a distance from the target device to each of the one or more anchor devices from which a wireless signal was received; and (iii) estimate, based on the estimated distances, a location of the target device within the environment.

According to an embodiment, the target device is a laptop, smartphone, tablet, activity tracker, wearable device, or other computerized device with a wireless signal transceiver.

According to an embodiment, the processor comprises an application configured to perform said determining and estimating steps.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a method and system for localization using localized signals from signal-enabled devices. According to an embodiment, the received signal strength indication (RSSI) value of wireless signals from several wireless signal-enabled devices are recorded, and the distance to each device can be estimated using the RSSI value. The distance information is then used for localization analysis, and the output provides the relative positions of the wireless signal-enabled target devices.

According to an embodiment, the methods and systems for localization described or otherwise envisioned herein can utilize a variety of localized signals from signal-enabled devices, such as WiFi, ZigBee, Bluetooth, or any other wireless personal area network. The signal-enabled device may be any device capable of, configured to, or modifiable to emit one or more types of signals. For example, the signal-enabled device may be a tablet, smartphone, wearable device, activity tracker, headphones, watch, or any other type of device.

Figure 1:
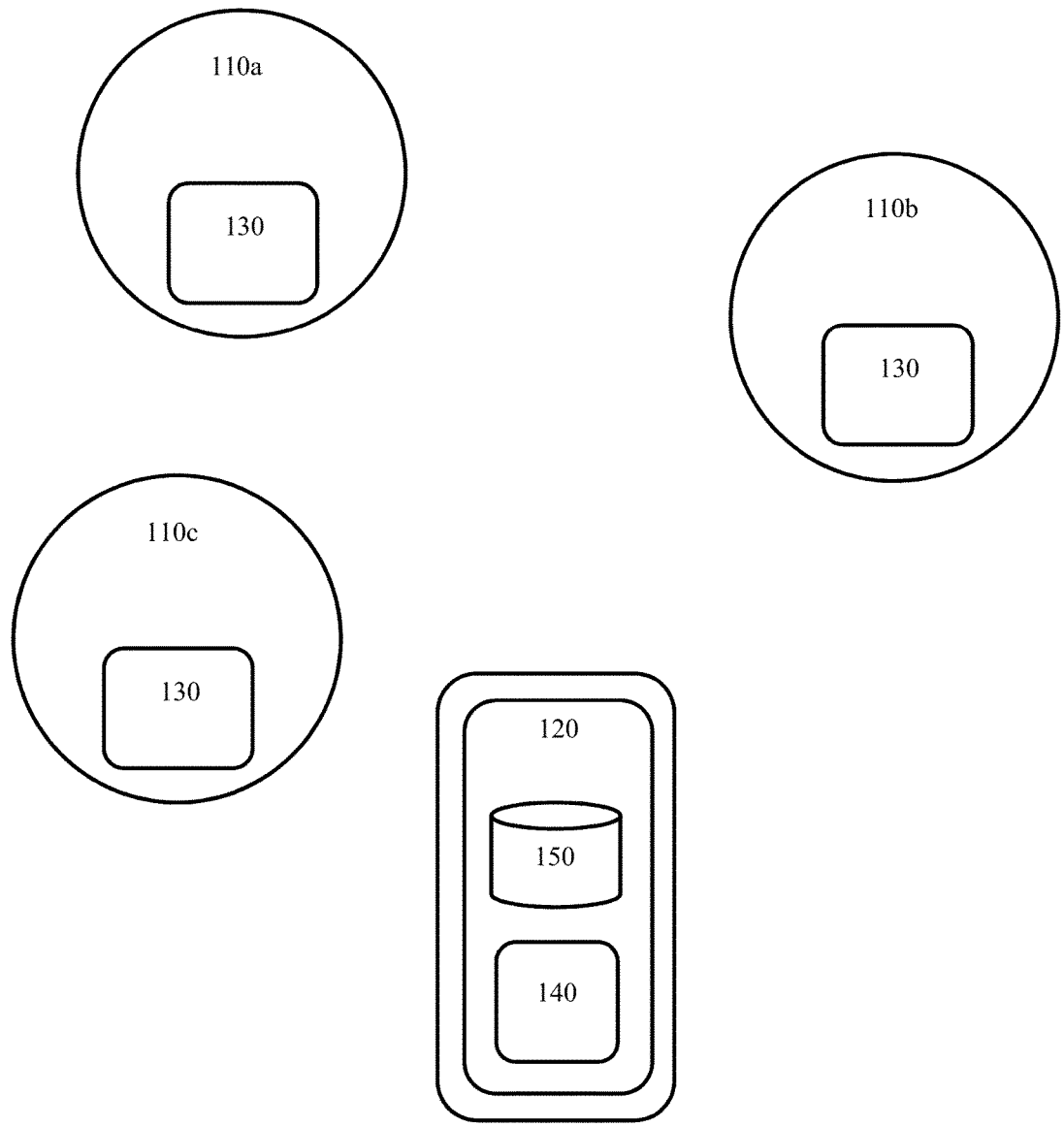
FIG. 1 is a schematic representation of a system for localization using wireless signals, in accordance with an embodiment.

Referring to FIG. 1, in one embodiment, is a system 100 for localization using localized wireless signals. According to an embodiment, system 100 comprises one or more anchor devices 110 (110a, 110b, and 110c in FIG. 1, for example), which are configured to transmit a wireless signal. The wireless signal can be any of the signals described or otherwise envisioned herein. According to an embodiment, the one or more anchor devices 110 are stationary within the system 100. According to another embodiment, anchor devices 110 may move according to a well-defined pattern, or may move between uses. Calibration of the system can be configured to adapt to movement of the anchor devices 110 within the system.

According to an embodiment, one or more of the anchor devices 110 can comprise a calibration module or algorithm 130 configured to calibrate the system as described or otherwise envisioned herein. According to one embodiment, the calibration module or algorithm 130 of a first anchor device collects RSSI samples from every other anchor 110 in the system, and utilizes that information to calibrate the system.

System 100 also comprises a receiving or target device 120. Target device 120 is configured to receive the wireless signals from the one or more anchor devices 110 within the system. The target device is optionally configured with an application that stores the received signals, and/or receives the signals and processes the signals. According to another embodiment, target device 120 transmits the signals to a remote processor, server, or computer where the signals are processed. According to an embodiment, target device 120 may be any of the devices described or otherwise envisioned herein, including but not limited to a tablet, smartphone, wearable device, activity tracker, headphones, watch, or any other type of device.

According to an embodiment, target device 120 may comprise a localization app, module, or algorithm 140, as described or otherwise envisioned herein. According to one embodiment, the localization app, module, or algorithm 140 is range-based and calculates location of the target device relative to the discovered anchors 110 through a process of multilateration. According to an embodiment, using several anchor nodes at known locations, the algorithm estimates the location of the target device.

Figure 2:
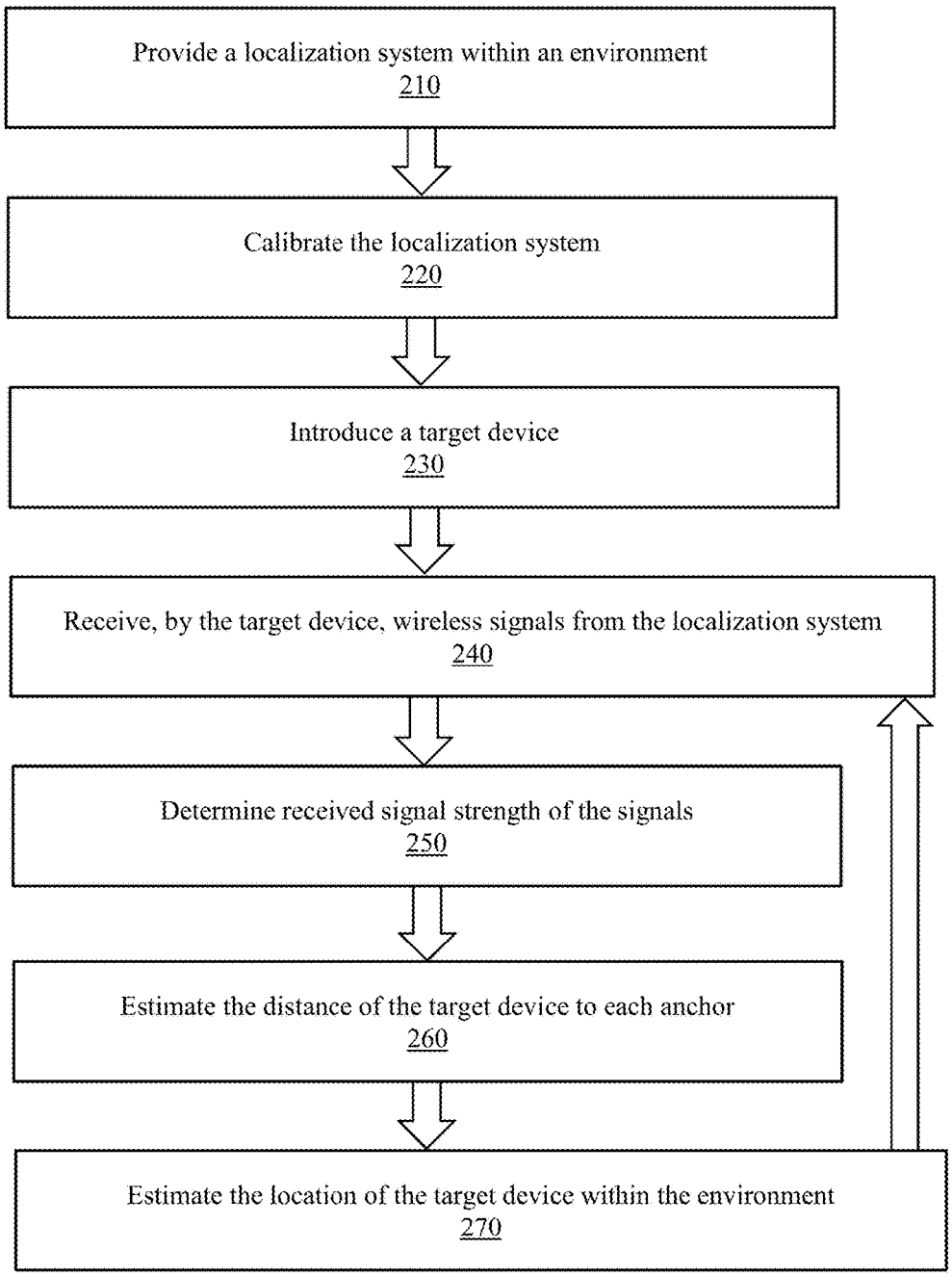
FIG. 2 is a flowchart of a method for localization using wireless signals, in accordance with an embodiment.

Referring to FIG. 2, in one embodiment, is a flowchart 200 of a method for localization using localized wireless signals. At step 210 of the method, a system 100 or environment for localization is provided. The system comprises, for example, one or more anchor devices 110, which are configured to transmit a wireless signal.

At step 220 of the method, the system 100 performs a calibration. For example, as described herein, a component of the system, such as one or more of the anchor devices 110, may comprise a calibration module or algorithm 130. According to one embodiment, the calibration module or algorithm 130 of a first anchor device collects RSSI samples from every other anchor 110 in the system, and utilizes that information to calibrate the system.

At step 230 of the method, a target device 120 is introduced into the localization environment. For example, the target device 120 may be a computer, trackable, wearable, smartphone, or other device that a user is carrying or using within the environment. As just one example, a user may enter a shopping mall where GPS signals are not accurate or are not received, and will be unable to estimate location.

At step 240 of the method, the target device 120 receives one or more wireless signals from one or more of the anchor devices 110 within the system. For example, the target device may be a smartphone that receives a Wifi or Bluetooth signal from each of the anchor devices 110 within the environment.

At step 250 of the method, a localization algorithm of the target device determines a received signal strength indication (RSSI) for one or more of the received wireless signals.

At step 260 of the method, the localization algorithm of the target device estimates, based on the determined RSSI for the received wireless signals, a distance from the target device to each anchor device 110 for which the target device has received a wireless signal.

At step 270 of the method, the localization algorithm of the target device estimates, based on the estimated distances from the target device to the respective anchor devices, a location of the target device within the environment. According to an embodiment, the localization algorithm utilizes trilateration or multilateration to determine the location of the target device within the environment, as described or otherwise envisioned herein.

The method may be repeated, including steps 240 through 270, especially if the target device is actively moving within the environment. Continuing the example, if the user is carrying the smartphone around within the mall, this method will be conducted periodically or continuously in order to determine a renewed estimate of the location of the smartphone. Optionally, the method may be performed only when the user requests a location estimate.

EXAMPLE

Localization Using Bluetooth Signals

According to an example, provided herein is implementation of the method and system using Bluetooth-enabled Android® devices. Using the Android software development kit (SDK), an application was developed to read the RSSI values of nearby devices. Continuous scanning of the Bluetooth transmitters in the immediate area allowed for real-time updates of the RSSI values with each scan. Through various signal processing techniques the data from these scans was used to generate a distance (ranging); and with sufficient ranging it was possible to attempt localization. Even for less than ideal ranging accuracy, with enough anchors, the localization algorithm was able to minimize the error.

Bluetooth was chosen as an example to implement the ranging methodology for several reasons. In addition to Bluetooth being present on the vast majority of mobile devices, the RSSI function is included in the Bluetooth stack on Android. This means that the Bluetooth signal strength could be read directly from the anchor device, which facilitated ranging. Furthermore, Bluetooth Low Energy (BLE) is an available feature on most Android devices as well, and this feature could potentially increase battery life when using the application. Other features that made Bluetooth a promising candidate for localization were its range and support. Bluetooth is a familiar and well-documented technology that has an appropriate range for the application, such as, for example, approximately 10 meters for Class 2 devices. According to another embodiment, it is possible to achieve a range of 100 meters with Class 1 devices, which may be beneficial for applications that require a larger range or possible improvements in accuracy.

The Android Software Development Kit (SDK) is free open-source software provided by Google®. Using the SDK it was possible to create an application that runs on the Android OS on mobile devices. Since the Android OS is designed for mobile touchscreen devices, the SDK provides a wide range of features that are helpful in developing applications and UI's. The programming language used in the SDK is the well-developed and well-documented Java programming language, and therefore other applications such as Eclipse may be used instead of Android Studio. The SDK provides access to the Bluetooth transceiver on the mobile devices, and has large support for Bluetooth connectivity.

Ranging Approach

Figure 3:
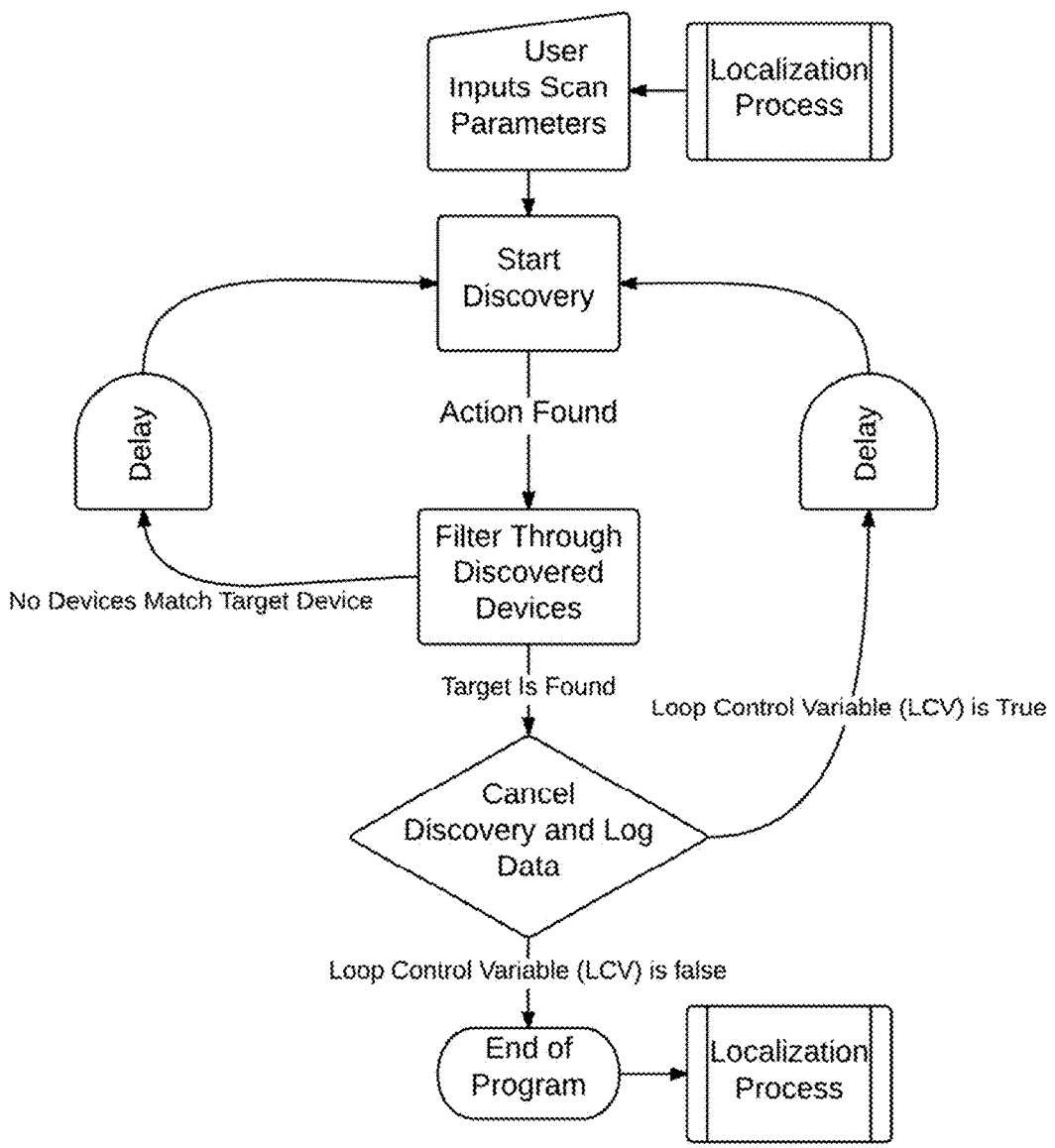
FIG. 3 is a flowchart of a representative application utilized to log RSSI data, in accordance with an embodiment.

According to an embodiment, the first step to implement ranging was to develop an application that collects RSSI data. Using this data, a curve can be fit that will be useful in generating a distance from a given RSSI value. An application entitled "RSSI Distance and Data Logger" was developed to scan for Bluetooth devices in the area for a specific number of RSSI values. Once scanning is complete, the application prompts the user for a filename that will be used to save the data. Upon entering the name of the file the data is saved to text file on the Android device. Referring to FIG. 3, in one embodiment, is a representative program flow 300 of the developed Android application to log RSSI data.

Using the developed application, it was possible to design and set up experiments to log RSSI values over various distances. Once there is enough data for each specific device it is possible to observe the attributes of the RSSI distributions. The RSSI values generally ranged from −30 dBm to −70 dBm, which is a relatively small amount of power (1 µW to 100 pW), and thus small fluctuations in the conditions of the environment may have a large effect on the RSSI. Accordingly, several experiments were designed to test the behavior of RSSI values over distance, in different environments, using different hardware, and finally in localization experiments with targets at unknown locations.

Range Testing

Figure 4:
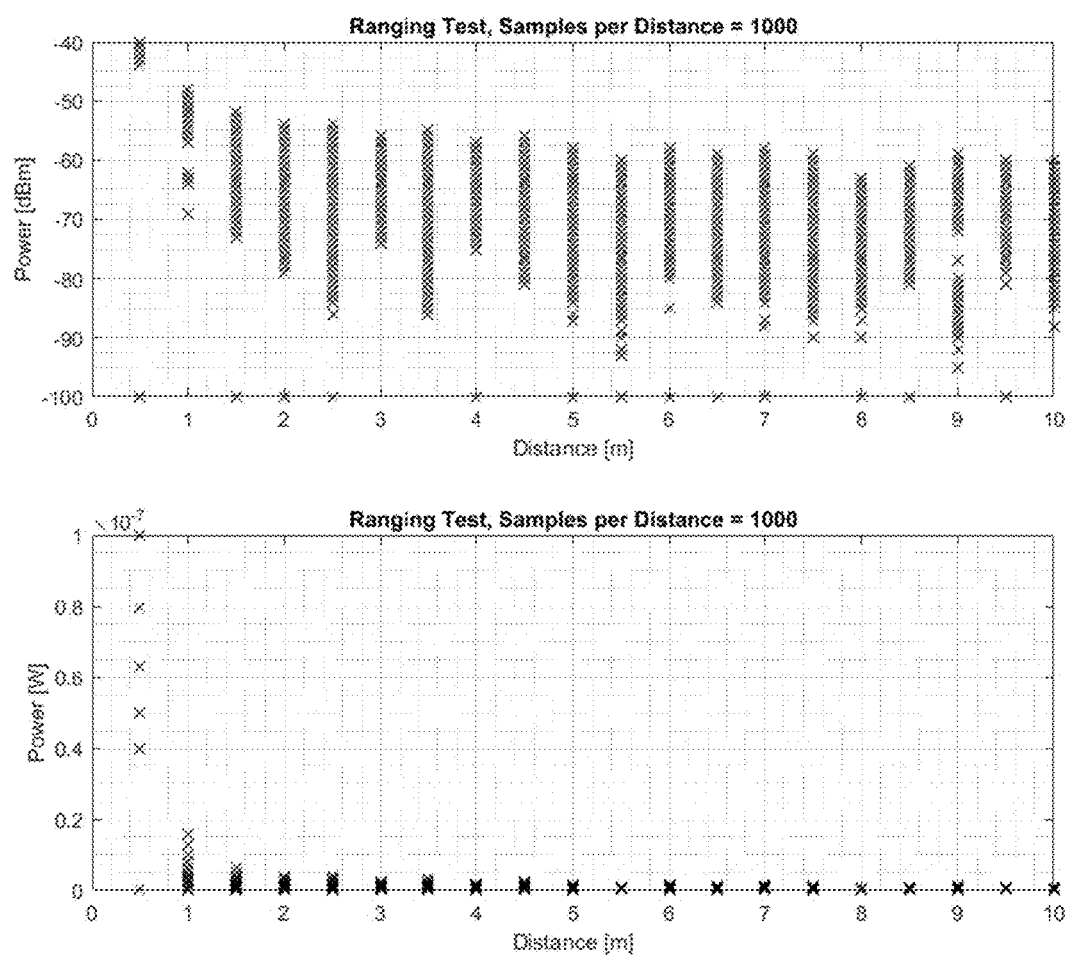
FIG. 4 is a graph of RSSI attenuation over distance in dBm (top) and Watts (bottom), with 1000 samples at each location, in accordance with an embodiment.

Range testing was performed in order to see how the RSSI values behave over distance. In order to investigate this, two devices were placed on stationary tripods in an open environment. Interference and reflections introduced by environments with obstacles such as walls, furniture, people, etc were minimized. In this experiment, one device is the transmitter, and the other is the receiver, which logs a set amount of data, which can specified by the user. The user can also specify the file to store the data, the delay between scans, and the Service Set Identifier (SSID) of target devices. Referring to FIG. 4, in one embodiment, are graphs of RSSI attenuation over distance in dBm (top) and Watts (bottom), with 1000 samples at each location.

After a sufficient amount of data was collected at a first distance, the devices were moved to the next position and more data was taken. Enough data was taken to cover the ten-meter range specified by the Bluetooth protocol at half-meter intervals. The results demonstrate that RSSI value attenuates linearly over distance when plotted in dBm and exponentially when using Watts. With the information from the range testing it is possible to fit a curve to the data that will allow one to generate distances from RSSI values. The curve will take the following form:

$$y = \alpha d^{-G} \qquad \text{Eq. (1)}$$

where α is a scaling factor, d is the distance, and G is the curve fitting constant which defines the slope of the curve. In free space the expected value for G is 2. However, in environments with interference this value will be increased.

Figure 5:
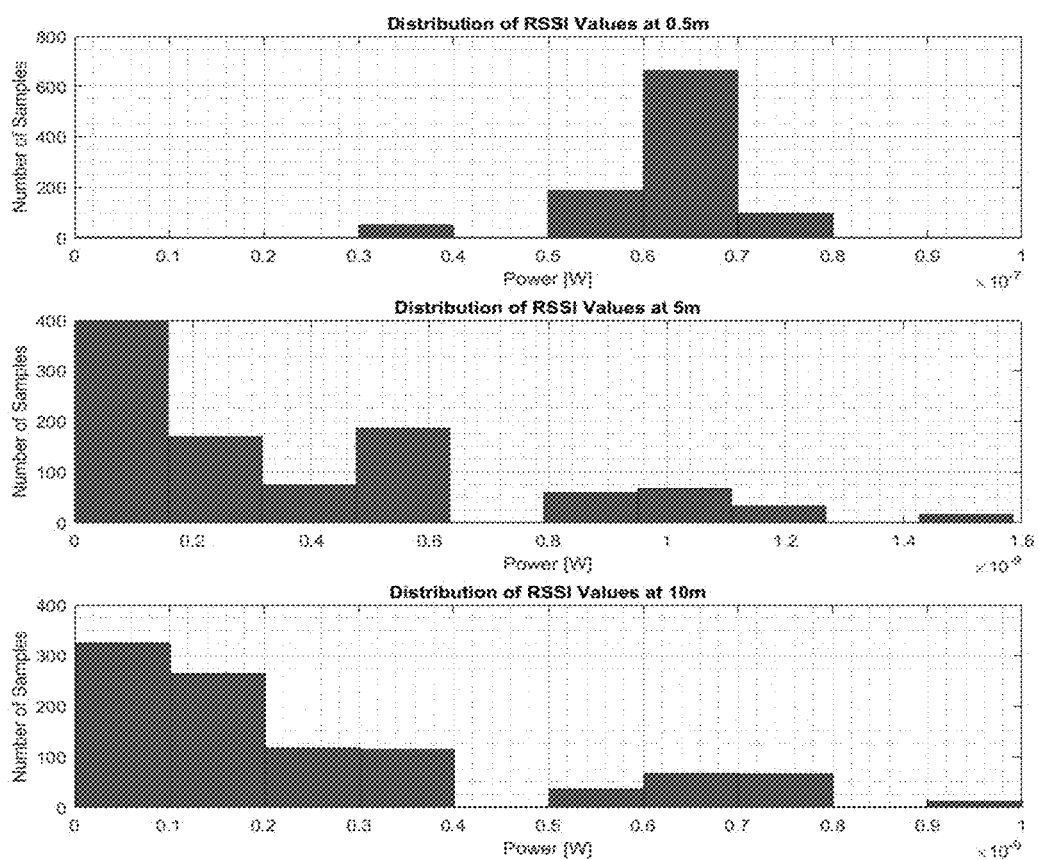
FIG. 5 is a graph of distributions of RSSI samples at distances of 0.5 m (top), 5.0 m (middle), and 10.0 m (bottom), in accordance with an embodiment.

The distribution of RSSI samples was also examined. Referring to FIG. 5, in one embodiment, are distributions of RSSI samples at distances of 0.5 m (top), 5.0 m (middle), and 10.0 m (bottom). In the first plot (distance 0.5 m) the distribution appears random (possibly normally distributed), with the majority of RSSI values falling on the mean. However in the next two distribution plots (distances 5.0 m and 10.0 m respectively) a greater amount of variance or noise is seen. This indicates a relationship between the distance between nodes and the variance in their distribution of RSSI samples.

Environment Testing

In order to implement ranging in different environments it is important to understand how these RSSI values behave in these environments. To determine how the RSSI values received by a device are affected by the environment, several experiments were held in various different spaces. The first ranging experiment mentioned in the previous section provides a first example of the behavior of the system. That behavior could then be compared to testing done in environments where there was more interference and reflection. It was expected that in areas of high reflection and interference the value for G in Equation 1 will increase. Indeed, indoor localization testing has yielded G values of roughly 6.0-7.0.

Calibration Testing

Calibration testing was performed in order to determine whether two different devices would have similar G values in similar environments. For example, testing was performed to determine whether two devices in the same room would have similar G values. In order to test this, an experiment was performed where two devices were set up inside a room at a known distance apart. Each device would transmit a signal until the other had collected the specified amount of data. Using the RSSI values from this test, and knowing the measured distance between the devices, it was possible to compute the ideal curve fitting constants for that particular space. This step was key to implementing ranging and localization in different environments. Allowing the devices to self-calibrate to the current environment increased accuracy and robustness of the algorithm, while only costing the user the time to perform the calibration step. In localization tests each anchor was calibrated to each of the other anchors. This allowed the user several options for choosing the required G value for each device in each environment. This step allowed the algorithm to work without knowing the transmit power of the target device.

Localization Algorithm and Testing

The localization algorithm used in the study is range-based and calculated through a process of multilateration. Using several anchor nodes at known locations, and one or several target nodes at unknown locations, the algorithm estimates the locations of the transmitting target nodes. According to an embodiment, it was first necessary to estimate the distance from each anchor to each target, and then use this information to solve a set of linear equations through a least squares solution. As discussed previously, the essential calibration step was completed to ensure accuracy of the ranging process.

Figure 6:
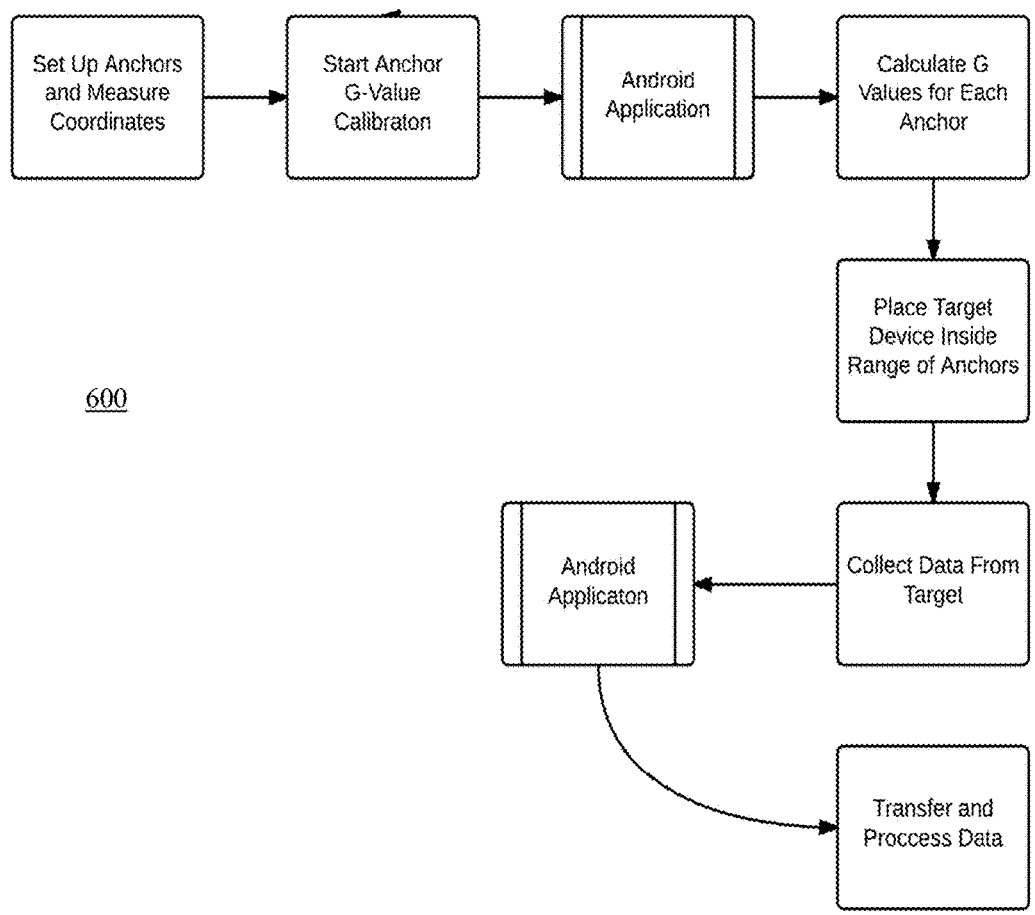
FIG. 6 is a flowchart of a method for localization using wireless signals, in accordance with an embodiment.

Referring to FIG. 6, in one embodiment, is a flowchart 600 of the algorithm. FIG. 6 also displays the proper process for performing a localization test. The reference to 'Android Application' in FIG. 6 is a reference to the program flow chart in FIG. 3.

Results

According to an embodiment, the output from the localization algorithm provides the coordinates of the target relative to the anchors and the origin of the X-Y plane which we have defined. Also plotted can be the estimated distances from each anchor to the target.

Figure 7:
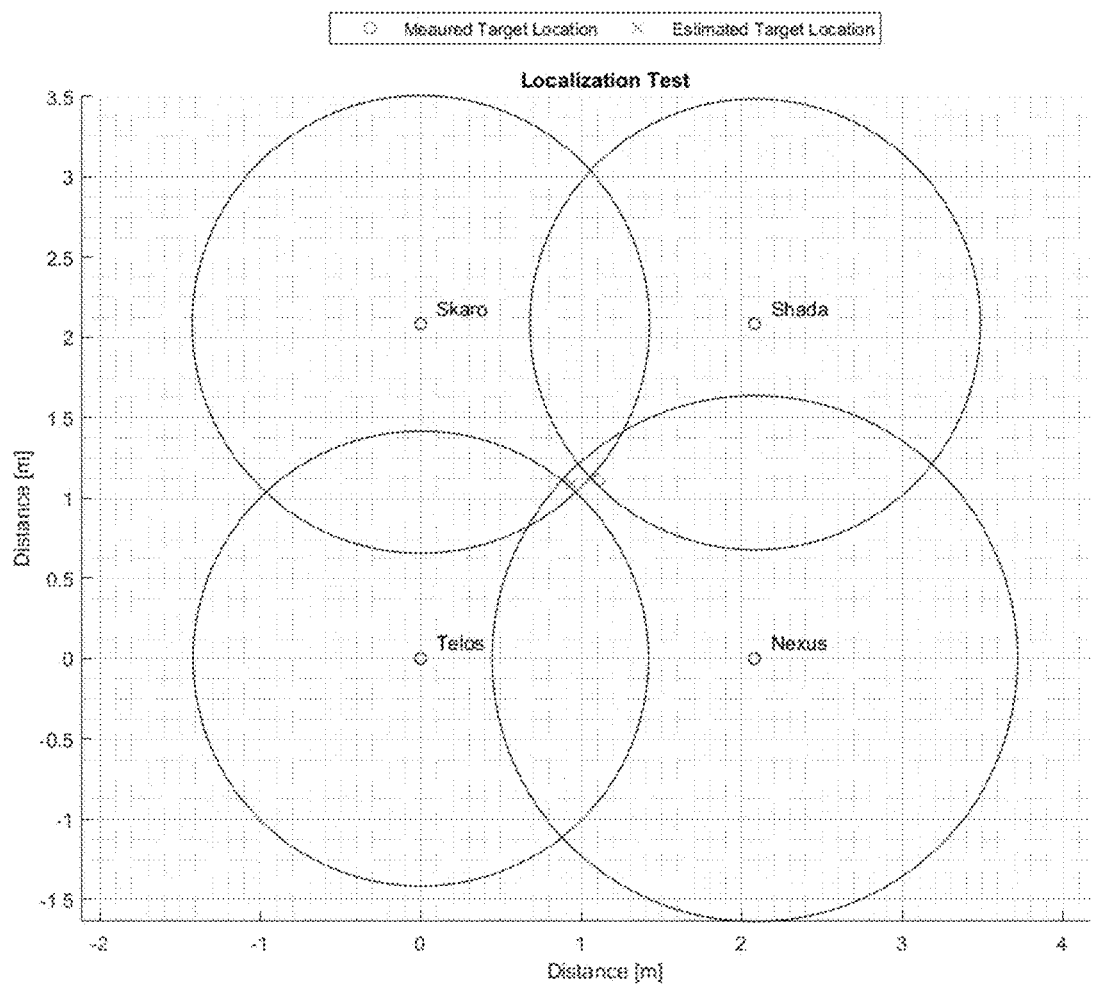
FIG. 7 is a schematic representation of the output of a localization test, in accordance with an embodiment.

Referring to FIG. 7, in one embodiment, is a graph of the output of a localization test after data has been collected. According to an embodiment, the MATLAB script plots and labels the positions of the anchors and the estimated position, as well as the measured position of the target device. Also shown are the estimated distances from each anchor to the target. The labels 'Telos', 'Skaro', 'Shada', and 'Nexus' are the SSID's of the anchor devices.

Any device that has Bluetooth capability can be used as a target device. Only anchor devices need to be running the Android OS because only the anchors are required to log RSSI data. For each target device the procedure can be exactly the same, and the device need only be discoverable to nearby devices. This approach is advantageous because it only requires that devices have their Bluetooth enabled, and no pairing of devices is needed. This allows for multiple targets to be discoverable at the same time and, conveniently doesn't require more scanning even though more than one target is present. Each scan returns all of the Bluetooth devices in range, and from this list of devices it is possible to filter through the list and use only the devices specified by the user.

Table 1, for example, provides examples of devices that have been tested using the application developed on Android. Devices with operating systems other than Android have been used as transmitters or targets, while the Android devices have been used as both transmitters and receivers (targets and anchors). This is important because it allows the user to potentially use any latent Bluetooth signal within range in the localization process.

TABLE 1

Devices Used in Localization and Ranging Tests

| Device Model | SSID | OS Version |
|---|---|---|
| Samsung Galaxy Tab 4 (SM-T230NU) | Telos | Android 4.4.2 |
| Samsung Galaxy Tab 4 (SM-T230NU) | Skaro | Android 4.4.2 |
| Samsung Galaxy Tab 4 (SM-T230NU) | Shada | Android 4.4.2 |
| Asus Nexus 7 (K008) | Nexus | Android 4.3 |
| Samsung Galaxy Note 5 (SM-N920V) | Note 5 | Android 5.1.1 |
| iPhone 5S | iPhone 5S | iOS 8.4 |
| Kou-Zone Q8H | polaris | Android 4.4.2 |
| MacBook Air 2013 | MacBook Air | OS X 10.9.4 |
| MSI G560 Laptop | MSI | Windows 10.1 |

According to an embodiment, there may be a consideration or investigation of the nature of RSSI distributions at different distances, including a relationship between the environment and the variance of the distributions.

According to an embodiment, the application may incorporate different types of ranging and localization. The features implemented into this GUI could be, for example, acoustic ranging, Bluetooth ranging, and Wi-Fi ranging, among others. Different ranging techniques such as TDOA (Time Difference of Arrival) and TOA (Time of Arrival) could also be utilized. According to an embodiment, the method or system may implement sequential localization through various methods, which could be configurable to the user, device, location, or other variables. The app may also include development for Bluetooth LE ranging to improve battery life and range. Other types of Bluetooth ranging could be explored, such as the TDOA and TOA methods have previously been accomplished acoustically. According to an embodiment, the application may incorporate indoor ranging vs. outdoor ranging, three-dimensional ranging, sequential localization, and localization of moving targets versus stationary targets, among many other variables.

EXAMPLE

Calibration Algorithm

One challenging aspect of using RSSI data is that Bluetooth signal strength is affected by several factors such as environments, variations in Bluetooth hardware, room size, and obstacles such as furniture, walls, people and ceilings. These issues can make ranging inaccurate, especially in environments with large amounts of reflections. In these instances, the signal strength does not vary inversely with distance. In addition, the Bluetooth advertisement signal suffers from fast fading effects (especially BT Classic), and the use of other radios (such as Wi-Fi) simultaneously on the device can introduce significant noise in the RSSI readings.

According to an embodiment, each anchor will collect M RSSI samples, $P_{dBm}=[P_1, P_2, \ldots, P_M]$, from every other anchor and convert each individual sample into Watts using:

$$P_W = \frac{1}{1000} 10^{\frac{P_{dBm}}{10}} \qquad \text{Eq. (2)}$$

Two constants will be calibrated to help mitigate the problems with ranging. The constants are from a power curve of the form:

$$\overline{P}_W = \alpha d^{-G} \qquad \text{Eq. (3)}$$

where $\overline{P}_W$ is the mean received power in Watts, d is the distance in meters, G is the path-loss exponent, and $\alpha$ is a scaling factor. The calibration constants $\alpha$ and G are estimated for each anchor.

To estimate the $\alpha$ and G values for each device, a method has been proposed to collect signal strength data between every pair of anchors and compare them to their respective distances. Each anchor device pair will calculate the mean power between transmitter and receiver:

$$\overline{P}_{l,k} = \frac{1}{M} \sum_{m=1}^{M} P_{Wm}, \qquad \text{Eq. (4)}$$

corresponding to the distance between them, $d_{l,k}$. The set of transmitting anchors is denoted by L and the set of transmitters by K. The total number of anchors is $|K|=|L|=N$.

In practice, all devices are used as transceivers in the Bluetooth protocol, but a distinction can be made based on which devices are logging the signal strength data (receivers) and which devices are discoverable (transmitters). In the calibration algorithm, each possible combination of anchors represents a transmitter and receiver pair, therefore there is $$\binom{N}{2}$$

configurations, or anchor pairs, since it is assumed:

$$\overline{P}_{l,k} = \overline{P}_{k,l} \qquad \text{Eq. (5)}$$

A system of linear equations was set up using the mean received power, $\overline{P}_W$, and the calculated distances between anchors as:

$$\{d_{l,k}\} = \{\|r_l\| - \|r_k\|\}, \qquad \text{Eq. (6)}$$

where $l \neq k$, $l \in L$, $k \in K$, $r_l$ is the is the position of the transmitting device, and $r_k$ is the position of the receiving device. Using the mean power and distance from equations 4 and 6, respectively, a least squares regression fit which estimates G (slope) and $\log(\alpha)$ (y-intercept) is calculated as follows:

$$\log_{10} \overline{P}_l = -G_l \log_{10} d_l + \log_{10} \alpha_l,$$

$$b_l = [\log_{10} d_l^T],$$

$$A_l = [\log_{10} \overline{P}_l^T, 1_{(N-1)\times 1}], \qquad \text{Eqs. (7-9)}$$

where $l \in L$.

The estimated regression parameters can now be calculated as:

$$\hat{x}_l = \begin{bmatrix} G_l \\ \log_{10} \alpha_l \end{bmatrix} = A_l^\# b_l, \qquad \text{Eq. (10)}$$

where $A^\#$, given by:

$$A^\# = (A^T A)^{-1} A^T, \qquad \text{Eq. (11)}$$

is the pseudo-inverse of A.

Using this method, calibration constants can be established for each anchor, provided that the distance-data vector $d_l$ contains at least two unique distance values.

EXAMPLE

Localization Algorithm

Once the curve fitting constants have been calibrated, it is possible to begin localization. Since all anchors have been calibrated, the only remaining step is to estimate distance from each anchor to the target using the received power between them. As soon as enough anchors have estimated distance to the target, it is possible to formulate and solve a set of linear equations to find the target. The location estimate will be at the centroid of the overlapping region made by the ranging circles.

According to one possible implementation, the algorithm starts by having the anchors collect M RSSI samples which will be stored in a vector $P_{dBm}=[P_1, P_2, \ldots, P_M]$. This vector will be converted to Watts using Equation 2. The mean power, $\overline{P}_W$, is found using Equation 4. In order to estimate distance, a modified version of Equation 3 is used as follows:

$$\rho = \left(\frac{\alpha}{\overline{P_W}}\right)^{-G} \qquad \text{Eq. (12)}$$

where $\rho$ is the estimated distance from an anchor to the target device. Once each anchor has estimated its distance to the target, the relative location of the target device can be found. Assuming that no anchors have been moved since calibration, we formulate the localization problem as:

$$r_0 = H^\# b, \qquad \text{Eq. (13)}$$

where the solution, $r_0$, represents the coordinates of the target device, $H^\#$ is the pseudo-inverse of H, as described in Equation 11:

$$H = [r_2 - r_1, r_3 - r_1, \ldots, r_N - r_1]^T \qquad \text{Eq. (14)}$$

and $$b = \frac{1}{2} \begin{bmatrix} \|r_2\|^2 - \|r_1\|^2 - (\rho_2^2 - \rho_1^2) \\ \|r_3\|^2 - \|r_1\|^2 - (\rho_3^2 - \rho_1^2) \\ \vdots \\ \|r_N\|^2 - \|r_1\|^2 - (\rho_N^2 - \rho_1^2) \end{bmatrix} \qquad \text{Eq. (15)}$$

The localization algorithm described in this example is implemented as an Android app. This app makes use of Google's Nearby API in order to communicate between devices and provide a network for a controller device (master) to send out instructions to anchor nodes. The app will use the master device to tell the anchors when and how much data to collect, when and where to send that data, and provide a real-time estimate of the location of the target based on this information. The app is designed to give various forms of feedback about the recorded data such as outliers and other quantities of statistical significance. The app features several different modes of operation depending on the desired application.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for localization of a target device within an environment, the method comprising the steps of:
    providing a localization system within an environment, the localization system comprising a target device and a plurality of anchor devices, wherein the target device and one or more of the anchor devices are movable within the environment;
    receiving, by each of the plurality of anchor devices, a plurality of received signal strength indication samples from another anchor device within the environment;
    calibrating the localization system prior to each localization of the target device, wherein calibrating comprises: (i) determining a location for each of the plurality of anchor device using the plurality of received signal strength indication samples received by each of the plurality of anchor devices;
    calibrating the localization system prior to each localization of the target device, wherein calibrating comprises: (i) obtaining, by each of the plurality of anchor devices, one or more received signal strength indication samples from every other of the plurality of anchor devices; (ii) converting, by each anchor device, the one or more received signal strength indication samples from every other anchor device into watts; and (iii) calculating calibration constants G and α for the anchor device utilizing the equation:

$$\overline{P}_w = \alpha d^{-G}$$

where $\overline{P}_w$ is mean power in watts for a received signal strength indication samples, d is a distance between a transmitting anchor device and a receiving anchor device, G is a path-loss exponent, and α is a scaling factor;
    receiving, by the target device, a plurality of wireless signals transmitted from one or more of the plurality of calibrated anchor devices;
    determining a received signal strength indication for at least some of the received plurality of wireless signals;
    estimating, based on the determined received signal strength indications, a distance from the target device to each of the one or more of the plurality of calibrated anchor devices from which a wireless signal was received using the formula $$\rho = \left(\frac{\alpha}{PW}\right)^{-G}$$

where ρ is a distance from the calibrated anchor device to the target device; and
    estimating, based on the estimated distances, a location of the target device within the environment, wherein estimating a location of the target device comprises trilateration or multilateration;
    wherein each of the target device and the plurality of anchor devices is configured to operate as a transmitter or as a receiver.

2. The method of claim 1, wherein the wireless signal is a WiFi, ZigBee, Bluetooth signal, or other wireless protocols.

3. The method of claim 1, wherein the method is repeated as the target device moves within the environment.

4. The method of claim 1, wherein the target device comprises an application configured to perform said determining and estimating steps.

5. A system for localization of a target device within an environment, the system comprising:
    a plurality of anchor devices located within the environment, each of the plurality of anchor devices configured to transmit a plurality of wireless signals to a target device, and wherein: (i) one or more of the plurality of anchor devices are movable within the environment; (ii) each of the plurality anchor devices is configured to transmit a plurality of signal strength indication samples to one or more of the other anchor devices within the environment; (iii) each of the plurality of anchor devices is configured to receive at least some of the transmitted plurality of signal strength indication samples; (iv) one or more of the plurality of anchor devices are configured to calibrate localization system prior to each localization of the target device, wherein calibrating comprises the steps of: (a) obtaining, by each of the plurality of anchor devices, one or more received signal strength indication samples from every other of the plurality of anchor devices; (b) converting, by each anchor device, the one or more received signal strength indication samples from every other anchor device into watts; and (c) calculating calibration constants G and α for the anchor device utilizing the equation:

$$\overline{P}_w = \alpha d^{-G}$$

where $\overline{P}_w$ is mean power in watts for a received signal strength indication samples, d is a distance between a transmitting anchor device and a receiving anchor device, G is a path-loss exponent, and α is a scaling factor;

a target device located within the environment, the target device configured to: (i) receive at least some of the plurality of transmitted wireless signals from the plurality of anchor devices, wherein the plurality of anchor devices are calibrated; (ii) determine a received signal strength indication for at least some of the received plurality of wireless signals; (iii) estimate, based on the determined received signal strength indications, a distance from the target device to each of the one or more anchor devices from which a wireless signal was received using the formula $$\rho = \left(\frac{\alpha}{\overline{P_W}}\right)^{-G}$$

where ρ is a distance from the calibrated anchor device to the target device; and (iv) estimate, based on the estimated distances, a location of the target device within the environment, wherein the target device is configured to estimate the location of the target device using trilateration or multilateration;

wherein each of the target device and the plurality of anchor devices is configured to operate as a transmitter or as a receiver.

* * * * *